(12) United States Patent
Li

(10) Patent No.: US 7,431,469 B2
(45) Date of Patent: Oct. 7, 2008

(54) POWER SUPPLYING SYSTEM FOR OUTDOOR UMBRELLA

(76) Inventor: Wanda Ying Li, 3000 Croddy Way, Santa Ana, CA (US) 92704

( * ) Notice: Subject to any disclaimer, the term of this patent is extended or adjusted under 35 U.S.C. 154(b) by 138 days.

(21) Appl. No.: 11/292,859

(22) Filed: Dec. 1, 2005

(65) Prior Publication Data
US 2007/0127231 A1 Jun. 7, 2007

(51) Int. Cl.
*A45B 3/02* (2006.01)
*F21L 4/00* (2006.01)
(52) U.S. Cl. .................. 362/102; 362/183; 135/910
(58) Field of Classification Search .......... 362/102, 362/252, 390, 183; 135/16, 910
See application file for complete search history.

(56) References Cited
U.S. PATENT DOCUMENTS
6,612,713 B1 * 9/2003 Kuelbs ............... 362/102
7,134,762 B2 * 11/2006 Ma ..................... 362/102
2004/0100791 A1 * 5/2004 Bilotti et al. ........ 362/102
2007/0058360 A1 * 3/2007 Li ...................... 362/102

* cited by examiner

*Primary Examiner*—John A Ward
(74) *Attorney, Agent, or Firm*—Raymond Y. Chan; David and Raymond Patent Firm

(57) ABSTRACT

An outdoor umbrella includes an awning, an umbrella frame, an illumination system, a power supplying system, a solar energy supplying system, and a powering control circuit. The power supplying system includes a rechargeable battery supported by the umbrella frame and is electrically connected with the illumination system for supplying electrical power to the illumination system. The solar energy supplying system includes a solar energy collection unit for collecting solar energy, and a solar battery unit. The powering control circuit electrically connects the solar battery unit with the rechargeable battery to coordinate a power supply to the illumination system, wherein the powering control circuit selectively switches the power supply of the illumination system between the power supplying system and the solar energy supplying system for ensuring the illumination system obtaining sufficient power to provide optimal level of illumination.

7 Claims, 18 Drawing Sheets

POWER SUPPLYING SYSTEM FOR OUTDOOR UMBRELLA

BACKGROUND OF THE PRESENT INVENTION

1. Field of Invention

The present invention relates to an outdoor umbrella, and more particularly to an outdoor umbrella which comprises a power supplying system for selectively switching a power supply of the illumination system of the outdoor umbrella.

2. Description of Related Arts

A conventional outdoor umbrella usually comprises an awning, a main supporting frame comprising an awning frame and a central post frame, and an illumination system supported on the main supporting frame for providing illumination towards an underneath of the awning. In order to provide electricity to the illumination system, the outdoor umbrella further comprises a power system mounted on the main supporting frame to electrically connect with the illumination system. The power system may be embodied as one of the followings: first, the power system may comprise a battery unit (which is usually rechargeable) mounted on the main supporting frame for providing electricity to the illumination system; second, the power system may comprise a solar energy collection system supported on the main supporting frame for collecting solar energy and converting the solar energy into electrically energy which is then transmitted to the illumination system.

A major disadvantage of the above-mentioned conventional outdoor umbrella is that there is no guarantee that the solar energy collection system can always store sufficient amount of solar energy during daytime so that the illumination system may not work properly as a result.

As an attempt to mitigate the above-mentioned difficulty, there exists another kind of outdoor umbrella which comprises an AC powering system for allowing the user to acquire electrical energy via an external AC power source. Yet the disadvantage of this latter kind of convention outdoor umbrella is that when the outdoor umbrella is utilized in outdoor environment, the user can hardly find an AC power socket. Even if the user can successfully find an AC power socket, the power cable connecting with the outdoor umbrella may not be long enough so that the user may have to shift the location at which the outdoor umbrella is utilized for acquiring the AC electrical power.

SUMMARY OF THE PRESENT INVENTION

A main object of the present invention is to provide an outdoor umbrella which comprises a power supplying system for selectively switching an optimal power supply of the illumination system of the outdoor umbrella, so that the outdoor umbrella is capable of constantly providing illumination at any time.

Another object of the present invention is to provide an outdoor umbrella which comprises a power supplying system and a solar energy supplying system, wherein the power supplying system is capable of acquiring electrical energy from an AC power source or from rechargeable battery for providing sufficient amount of electrical power to light up the illumination system of the outdoor umbrella when the solar energy supplying system does not collect sufficient amount of electrical power.

Another object of the present invention is to provide an outdoor umbrella which comprises a power supplying system and a solar energy supplying system, wherein the user is able to pre-recharge by AC power source the power supplying system when the outdoor umbrella is not in use, so that when the outdoor umbrella is utilized in outdoor environment, the power supplying system is switched on to provide sufficient amount of electrical energy for lighting up the illumination system even though the solar energy supplying system does not collect sufficient amount of solar energy.

Another object of the present invention is to provide an outdoor umbrella which is easy to use, and convenient to carry so as to facilitate widespread applications of the present invention.

Another object of the present invention is to provide an outdoor umbrella which does not involve complicated mechanical or electrical structures or components so as to minimize the manufacturing cost and the ultimate selling price of the present invention.

Accordingly, in order to accomplish the above objects, the present invention provides an outdoor umbrella, comprising:

an awning;

an umbrella frame comprising an upward supporting post, and an awning supporting frame which is detachably coupled with a top portion of the supporting post and is radially extended to support the awning to define a shading area thereunder;

an illumination system provided at the umbrella frame for illuminating the shading area of the awning;

a power supplying system, which comprises a rechargeable battery which is supported by the umbrella frame and is electrically connected with the illumination system for supplying electrical power to the illumination system; and a solar energy supplying system, comprising:

a solar energy collection unit supported on top of the umbrella frame for collecting solar energy so as to transform the solar energy into an electrical energy;

a solar battery unit which is supported at the umbrella frame and is electrically connected between the solar energy collection unit and the illumination system, wherein the solar battery unit is adapted for storing the electrical energy from the solar energy collection unit in use for the illumination system; and a powering control circuit electrically connecting the solar battery unit with the rechargeable battery to coordinate a power supply to the illumination system, wherein the powering control circuit selectively switches the power supply of the illumination system between the power supplying system and the solar energy supplying system for ensuring the illumination system obtaining sufficient power to provide optimal level of illumination.

These and other objectives, features, and advantages of the present invention will become apparent from the following detailed description, the accompanying drawings, and the appended claims.

DETAILED DESCRIPTION OF THE PREFERRED EMBODIMENT

Figure 1:
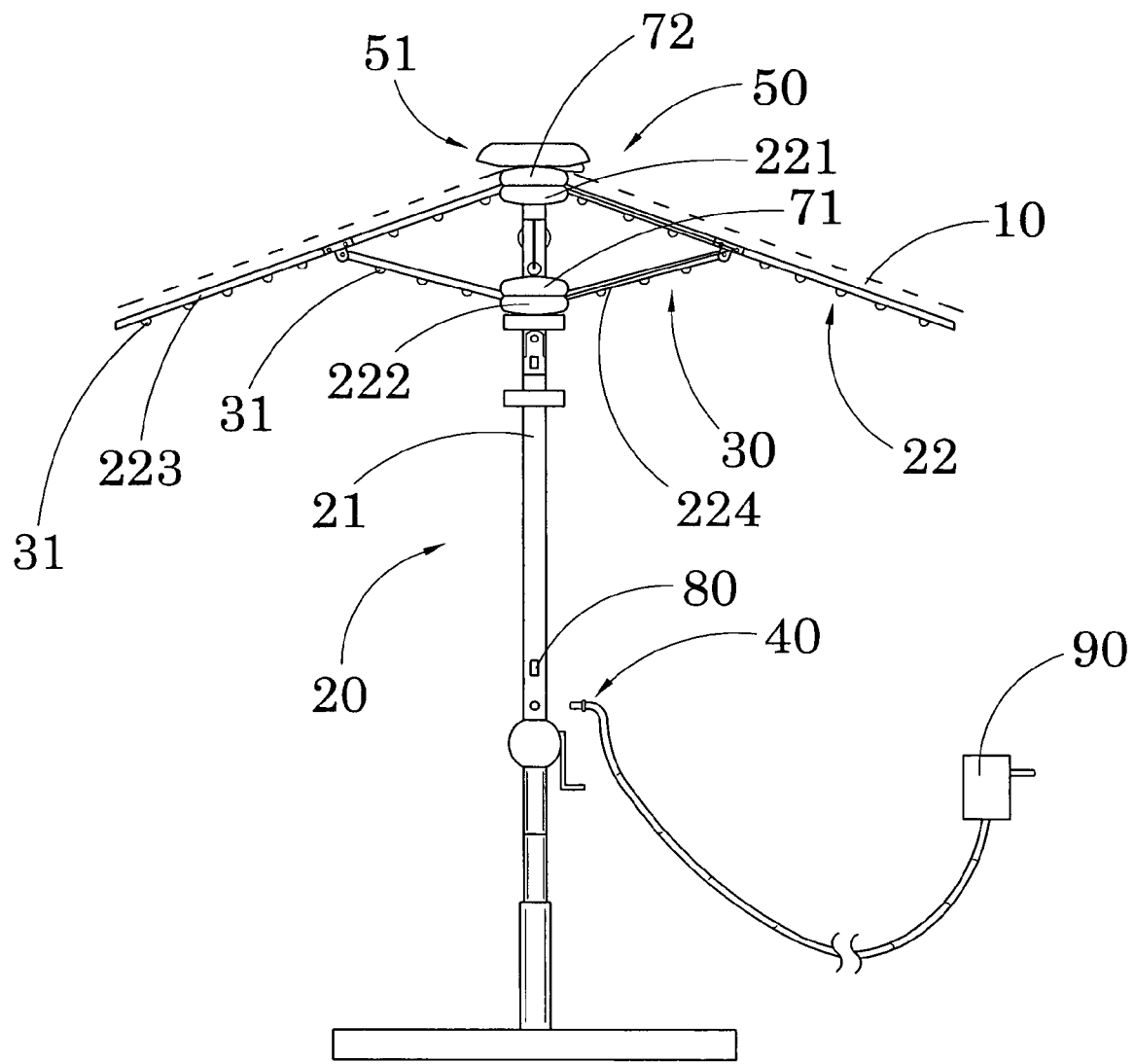
FIG. 1 is a side view of an outdoor umbrella according to a preferred embodiment of the present invention.

Referring to FIG. 1, FIG. 3, FIG. 8A and FIG. 8B of the drawings, an outdoor umbrella according to a preferred embodiment of the present invention is illustrated. According to the preferred embodiment of the present invention, the outdoor umbrella comprises an awning 10, an umbrella frame 20, an illumination system 30, a power supplying system 40, a solar energy supplying system 50, and a powering control circuit 60.

The umbrella frame 20 comprises an upward supporting post 21, and an awning supporting frame 22 which is movably coupled with a top portion of the supporting post 21 and is radially extended to support the awning 10 to define a shading area thereunder.

The illumination system 30 is provided at the umbrella frame 20 for illuminating the shading area of the awning 10.

The power supplying system 40 comprises a rechargeable battery 41 which is supported by the umbrella frame 20 and is electrically connected with the illumination system 30 for supplying electrical power to the illumination system 30.

Figure 5:
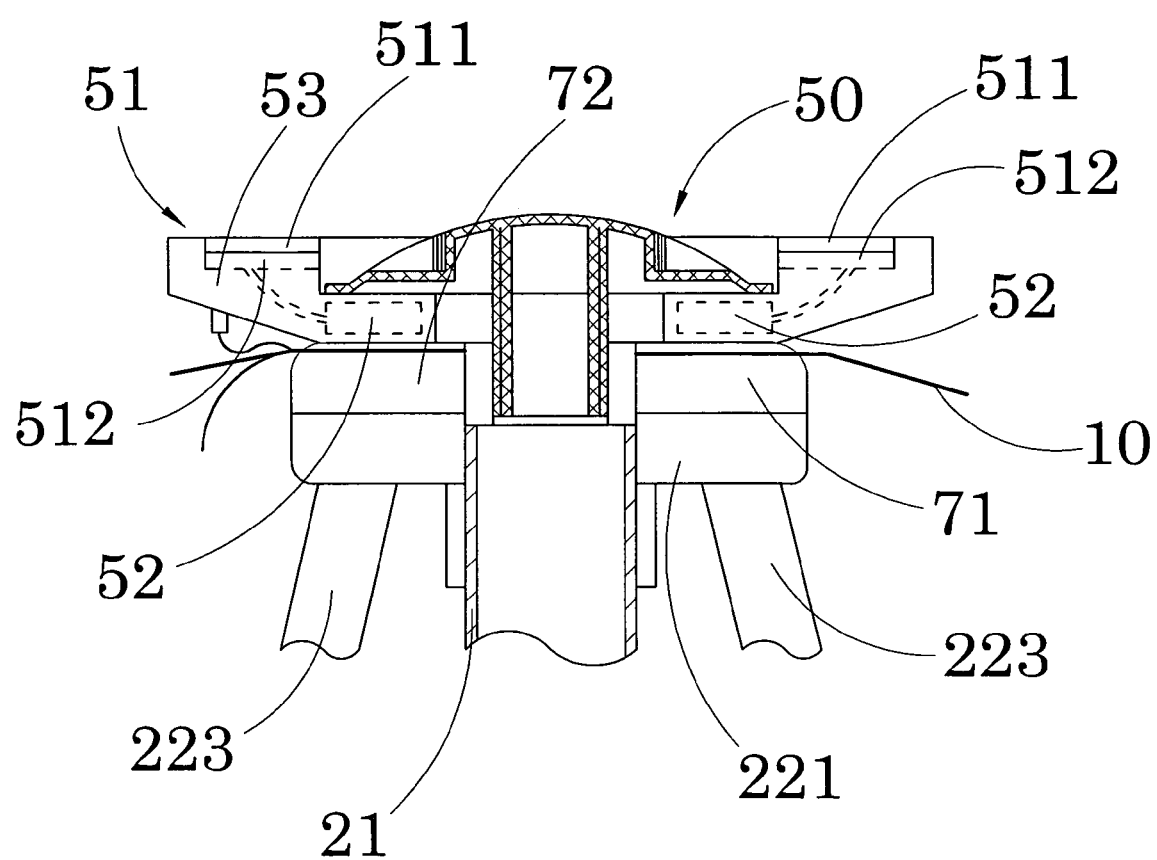
FIG. 5 is a schematic diagram of the solar energy supplying system of the outdoor umbrella according to the above preferred embodiment of the present invention.
Figure 6:
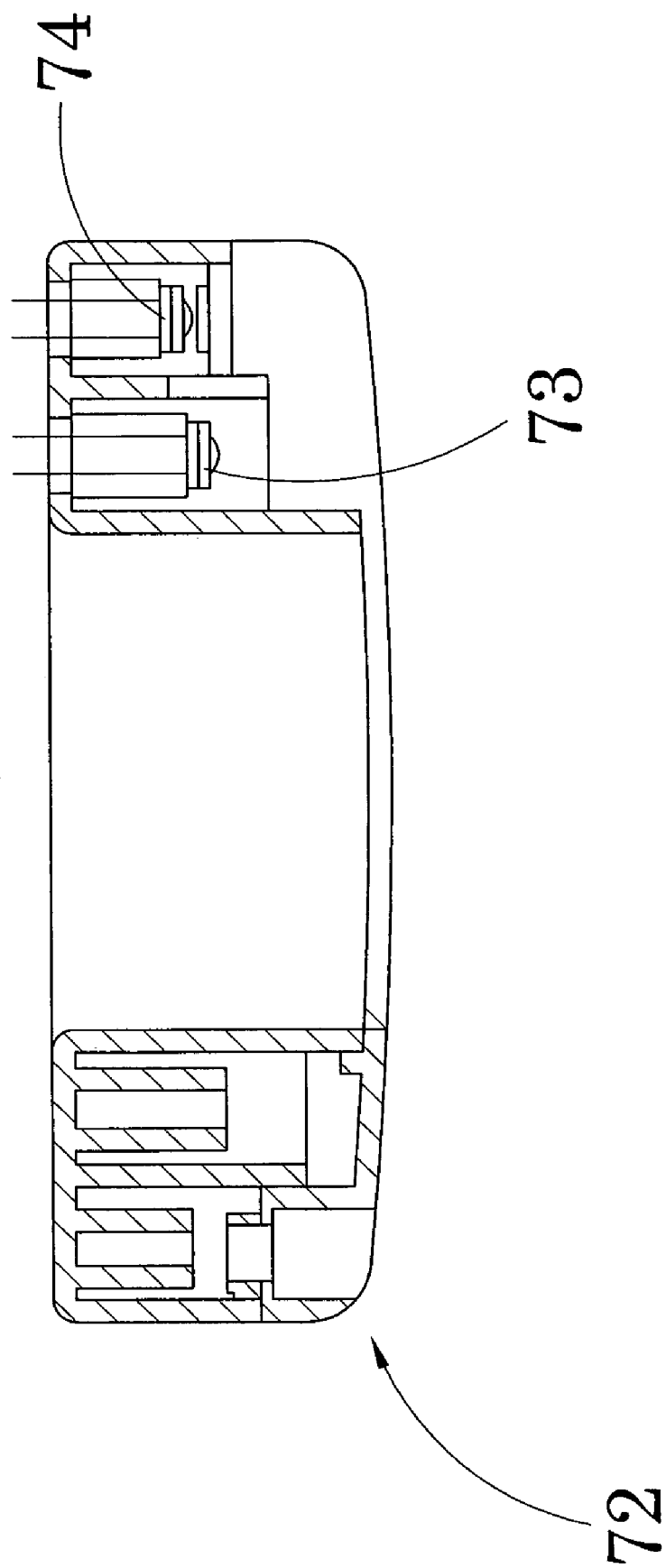
FIG. 6 is a sectional side view of the lower housing according to the above preferred embodiment of the present invention.
Figure 7:
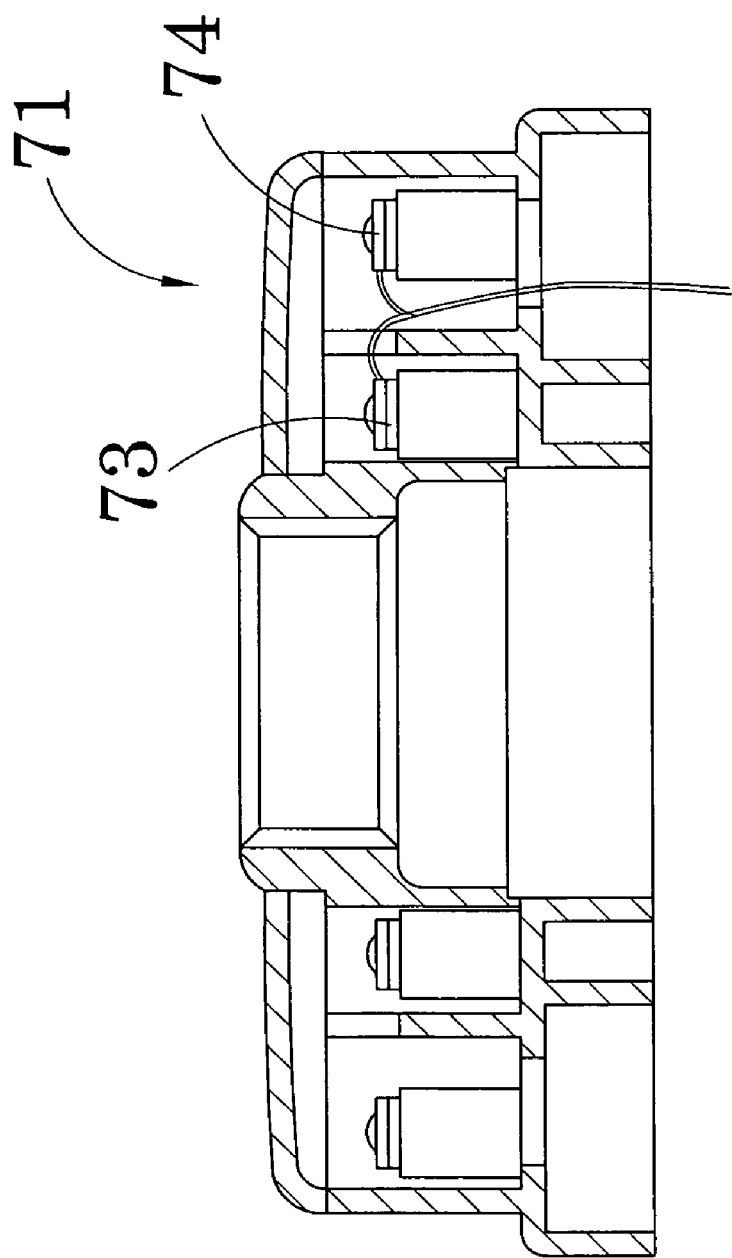
FIG. 7 is a sectional side view of the upper housing according to the above preferred embodiment of the present invention.

Referring to FIG. 5 of the drawings, the solar energy supplying system 50 comprises a solar energy collection unit 51 supported on top of the umbrella frame 20 for collecting solar energy so as to transform the solar energy into an electrical energy, and at least one solar battery unit 52 supported at the umbrella frame 20 and is electrically connected between the solar energy collection unit 51 and the illumination system 30, wherein the solar battery unit 52 is adapted for storing the electrical energy from the solar energy collection unit 51 in use for the illumination system 30.

The powering control circuit 60 is electrically connecting the solar battery unit 52 with the rechargeable battery 41 to coordinate a power supply to the illumination system 30, wherein the powering control circuit 60 selectively switches the power supply of the illumination system 30 between the power supplying system 40 and the solar energy supplying system 50 for ensuring that the illumination system 30 will obtain sufficient power to provide optimal level of illumination in the shading area.

According to the preferred embodiment of the present invention, the awning supporting frame 22 comprises an upper housing 221 affixed on top of the supporting post 21, a lower housing 222 slidably connected to the supporting post 21 at a position underneath the upper housing 221, a plurality of awning arms 223 radially and pivotally extended from the upper housing 221 to support the awning 10 thereon, and a plurality of awning ribs 224 pivotally connecting the lower housing 222 with the awing arms 223 respectively in such a manner that when the lower housing 222 is slid along the supporting post 21 towards the upper housing 221, the awning arms 223 are pivotally driven by the awning ribs 224 to foldably and radially extend from the upper housing 221 so as to provide the shading area under the awning 10.

Figure 2A:
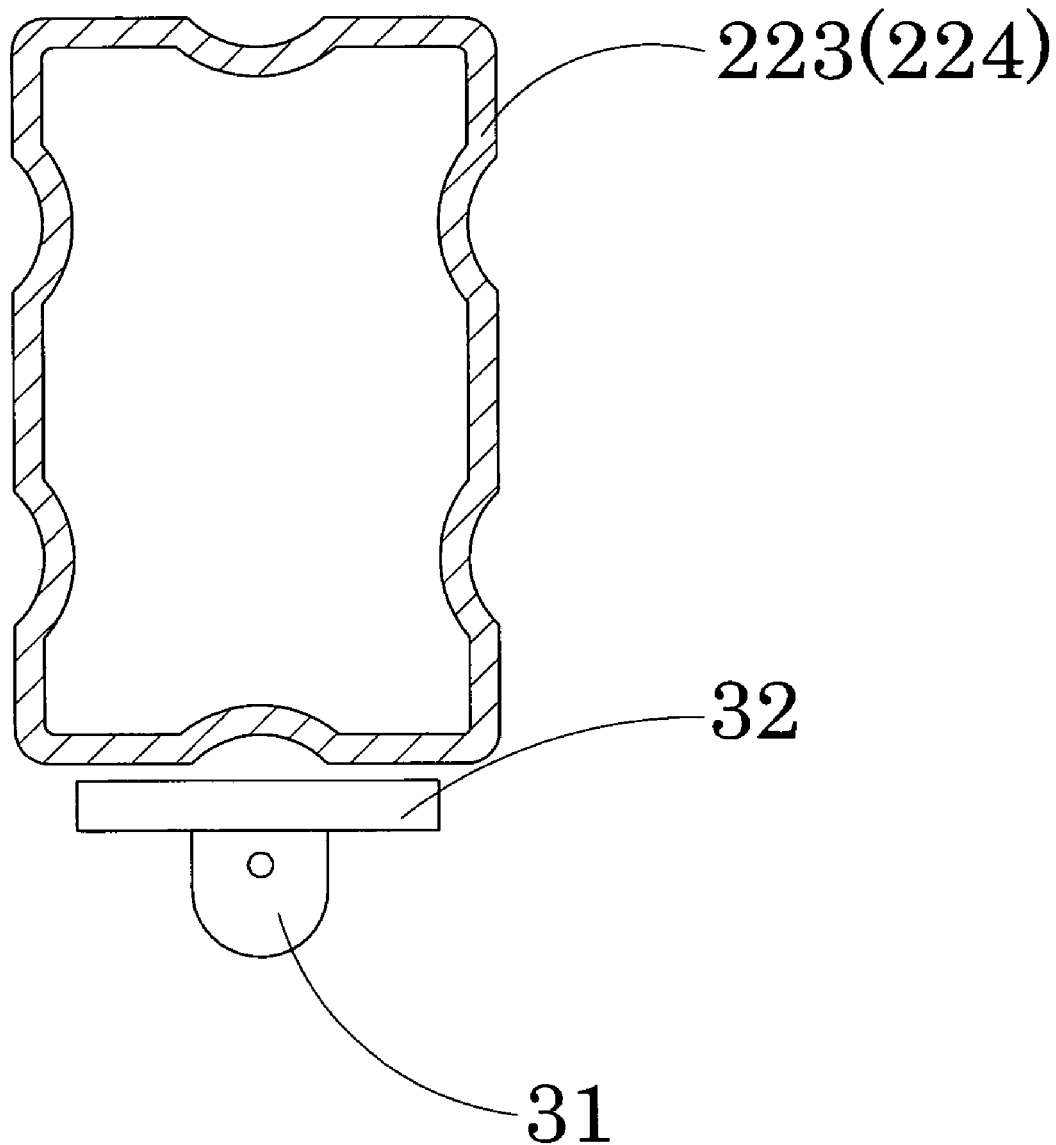
FIG. 2A and FIG. 2B are schematic diagrams of the illumination system according to the above preferred embodiment of the present invention.
Figure 2B:
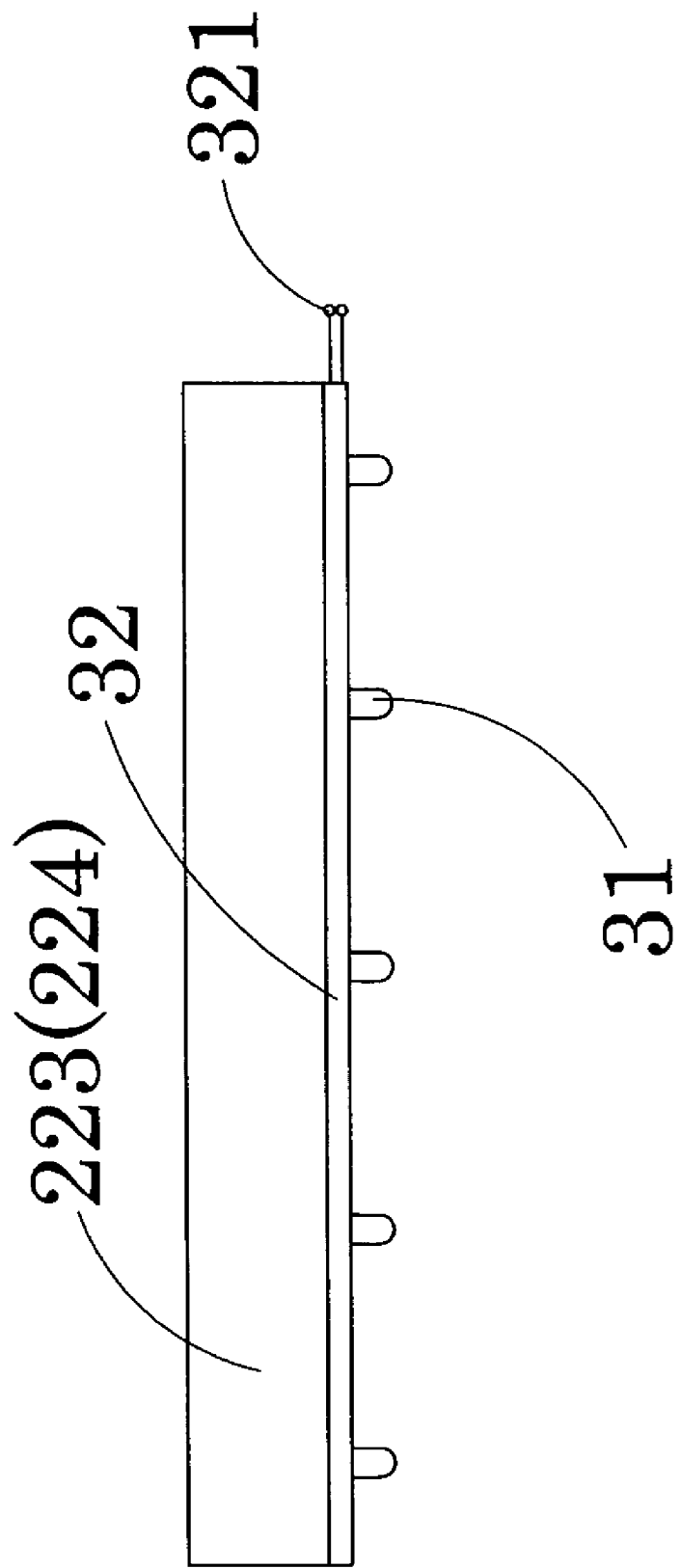
Figure 3:
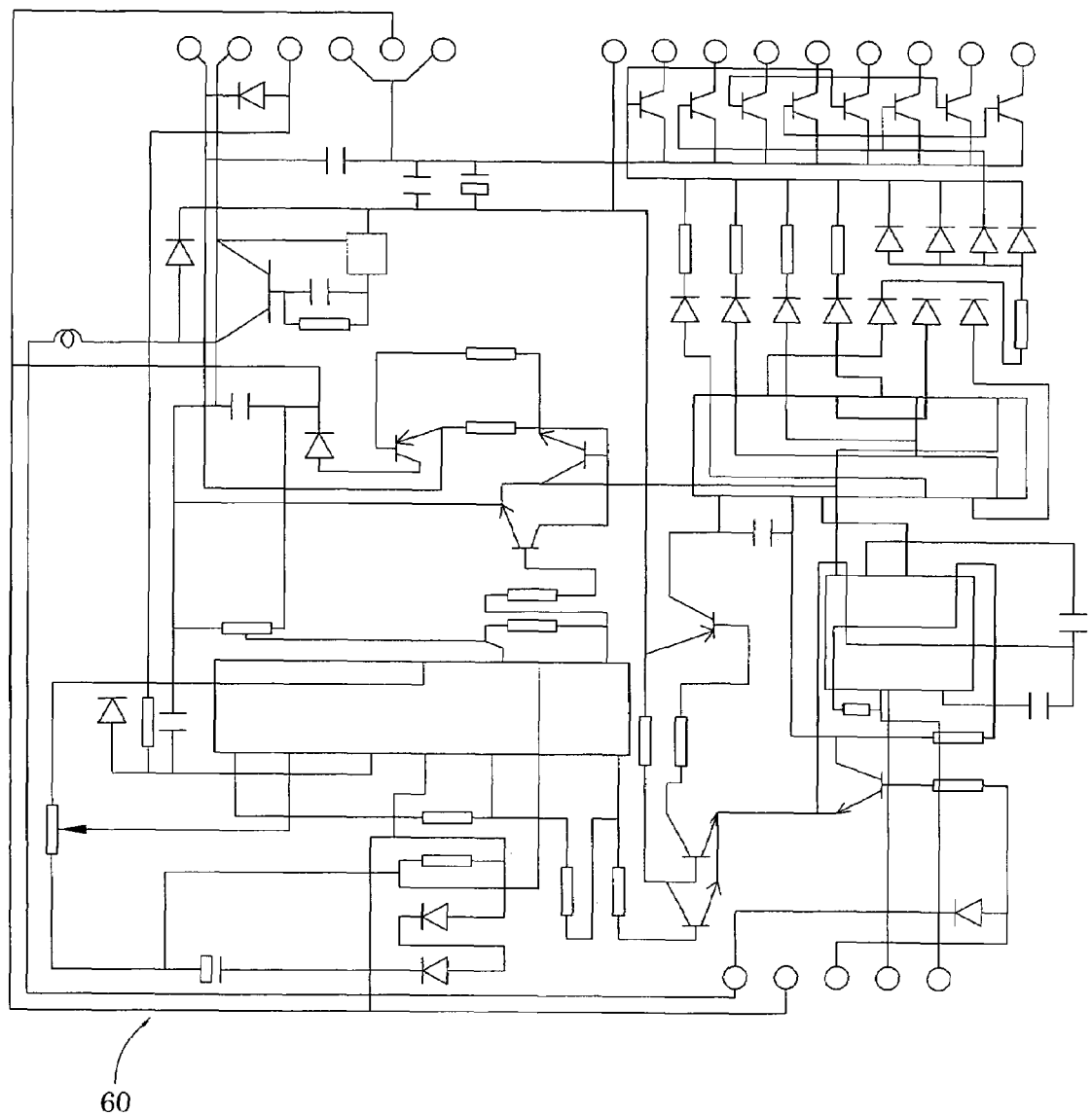
FIG. 3 is a schematic diagram of the power controlling circuit of the outdoor umbrella according to a preferred embodiment of the present invention.
Figure 4:
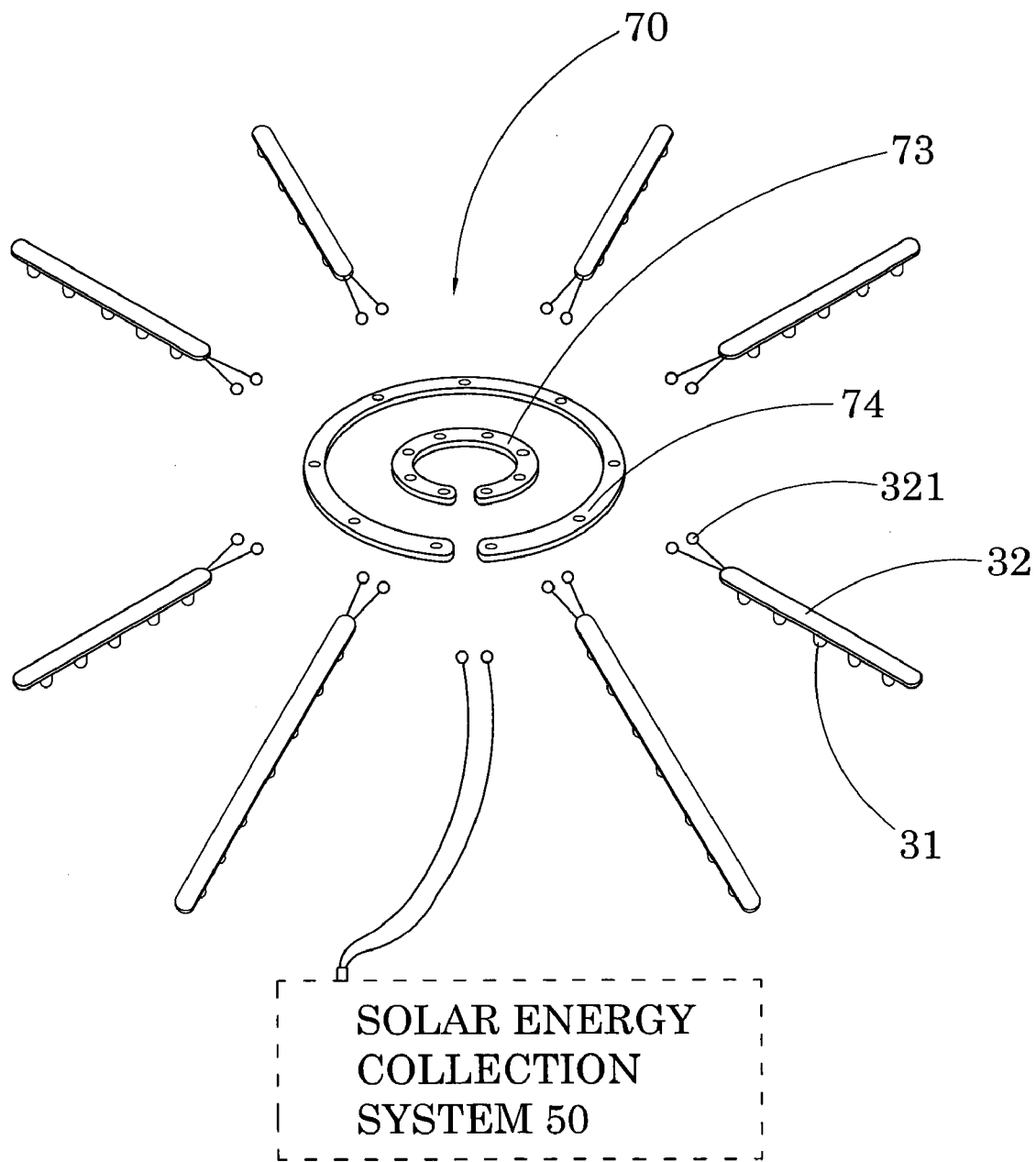
FIG. 4 is a schematic diagram of the power distribution system of the outdoor umbrella according to the above preferred embodiment of the present invention.

Moreover, the illumination system 30 comprises a plurality of illuminators 31 preferably embodied as Light Emitting Diodes (LEDs) mounted on the awning supporting frame 22 for providing illumination to the shading area. Referring to FIG. 2A and FIG. 2B of the drawings, the illumination system 30 further comprises a plurality of connection wires 32, each having a positive and a negative end terminal 321, mounted along the awning arms 223 and the awning ribs 224 of the awning supporting frame 22 respectively, wherein the illuminators 31 are spacedly supported by and electrically connected with the connection wires 32 on the awning arms 223 and the awning ribs 224 for providing illumination along the awning arms 223 and the awning ribs 224 so as to light up the shading area underneath the awning 10. It is worth mentioning that each of the connection wires 32 is preferably embodied as comprising a flattened plastic wire embedding an electric wire for connecting electricity at the illumination system 30.

The rechargeable battery 41 of the power supplying system 40 is supported on the umbrella frame 20 for selectively providing electrical power to the illumination system 30. It is important to point out that the rechargeable battery 41 is pre-recharged prior to use of the outdoor umbrella, so that it is capable of providing sufficient amount of electrical power to light up the illuminators 31 when the solar energy supplying system 50 fails to provide sufficient amount of electrical energy. It is worth mentioning that the rechargeable battery 41 may be detachable from the umbrella frame 20 so that it can be conveniently and separately recharged without being recharged by the solar energy supplying system 50.

Referring FIG. 4 to FIG. 7 of the drawings, the outdoor umbrella further comprises a power distribution system 70 disposed at the top portion of the supporting post 21 to electrically connect to the solar energy supplying system 50, wherein the plurality of illuminators 31 are electrically coupled to the power distribution system 70 and are spacedly mounted to the awning supporting frame 22 for illuminating the shading area of the awning 10.

The power distribution system 70 comprises an upper power hub 71 and a lower power hub 72 provided on the upper housing 221 and the lower housing 222 respectively for electrically connecting between the illumination system 30 and the solar energy supplying system 50 in such a manner that electrical power gathered by the solar energy supplying system 50 is conducted to the illumination system 30 via the upper power hub 71 and the lower power hub 72.

Each of the upper power hub 71 and the lower power hub 72 comprises a plurality of positive terminal connectors 73 and a plurality of negative terminal connectors 74 each of which is electrically connected to the corresponding positive end terminal 321 and the negative end terminal 321 of the corresponding connection wire 32 of the illumination system 30 respectively, wherein the upper power hub 71 and the lower power hub 72 are electrically connected with the solar energy collection system 50 so that the solar energy collected thereby can be transmitted to the connection wires 32 via the upper and the lower power hub 71, 72 for lighting up the illuminators 31.

According to the preferred embodiment of the present invention, the connection wires 32 mounting the illuminators 31 on the awning ribs 224 are electrically connected with the lower power hub 52 whereas the connection wires 32 mounting the illuminators 31 on the awning arms 223 are electrically connected with the upper power hub 71.

Figure 11:
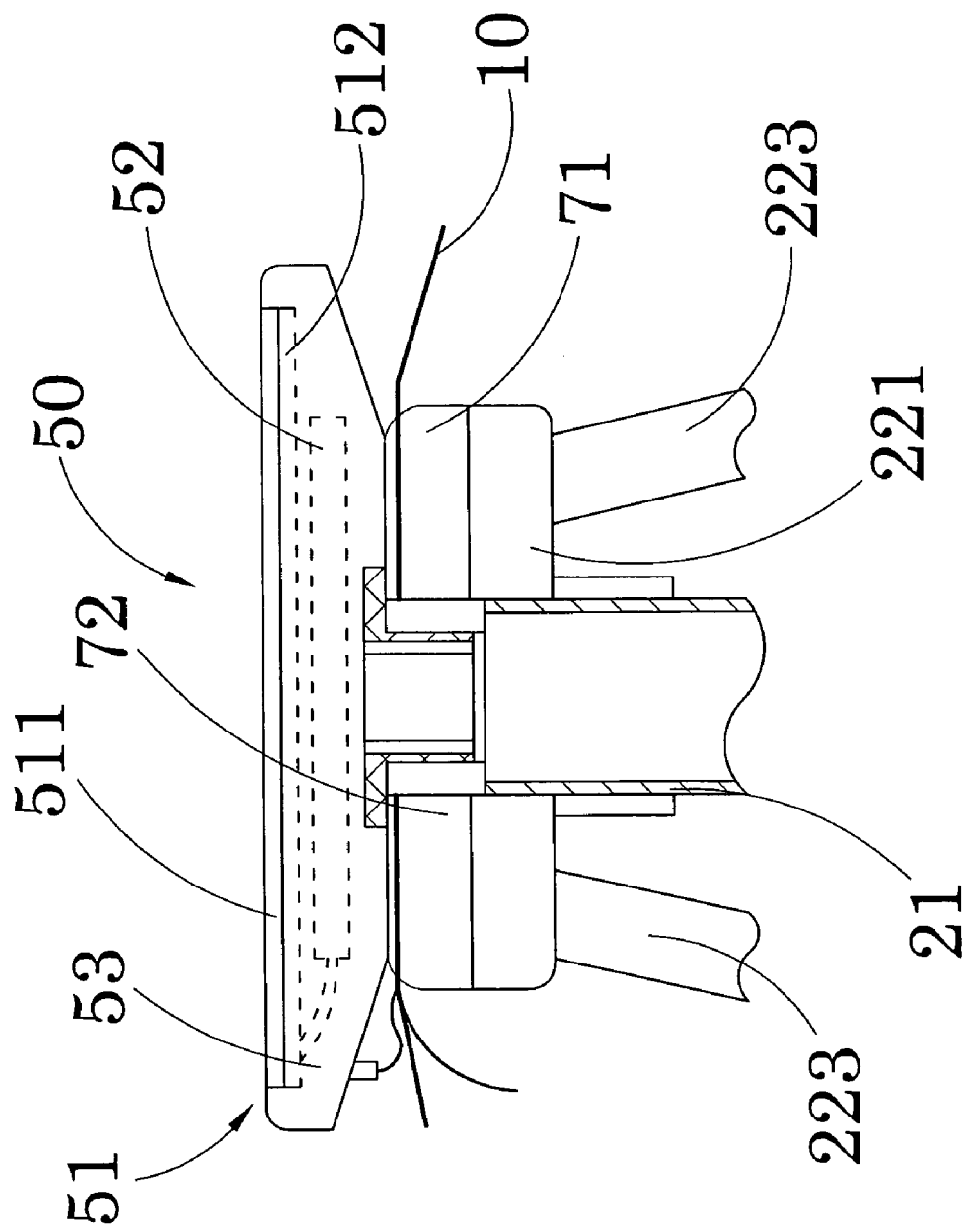
FIG. 11 is a schematic diagram of the outdoor umbrella according to the above preferred embodiment of the present invention, illustrating the solar energy supplying system comprises only one solar energy collection panel.

On the other hand, the solar energy supplying system 50 further comprises a solar energy housing 53 mounted on top of the upper housing 221 and the upper power hub 71, wherein the solar energy collection unit 51 and the solar battery unit 52 are securely supported by the solar energy housing 53 for collecting solar energy from sunlight. More specifically, the solar energy collection unit 51 comprises a plurality of solar energy collection panels 511 transversely extended on top of the solar energy housing 53 for exposing towards sunlight, and a solar conversion circuitry 512 electrically connecting between the solar energy collection panel 511 and the solar battery unit 52 for converting solar energy collected by the solar energy collection panel 511 into electrical power which is then transmitted to the solar battery unit 52 for storage. As an alternative, there can be only one solar energy collection panel 511 mounted on top of the solar energy housing 53 for collecting solar energy, as shown in FIG. 11 of the drawings.

Figure 8A:
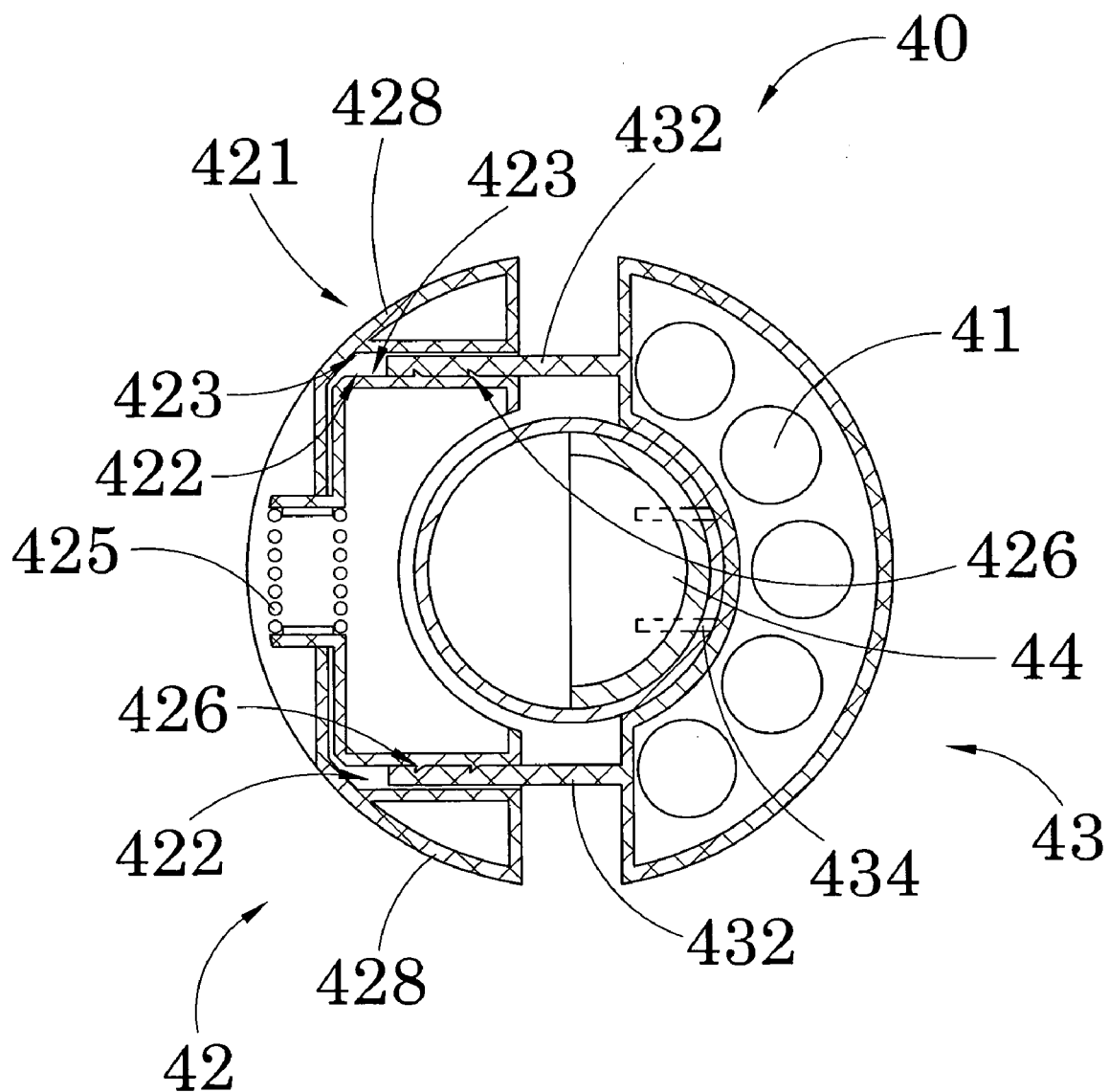
FIG. 8A and FIG. 8B are schematic diagrams of the power supplying system of the outdoor umbrella according to the above preferred embodiment of the present invention.
Figure 8B:
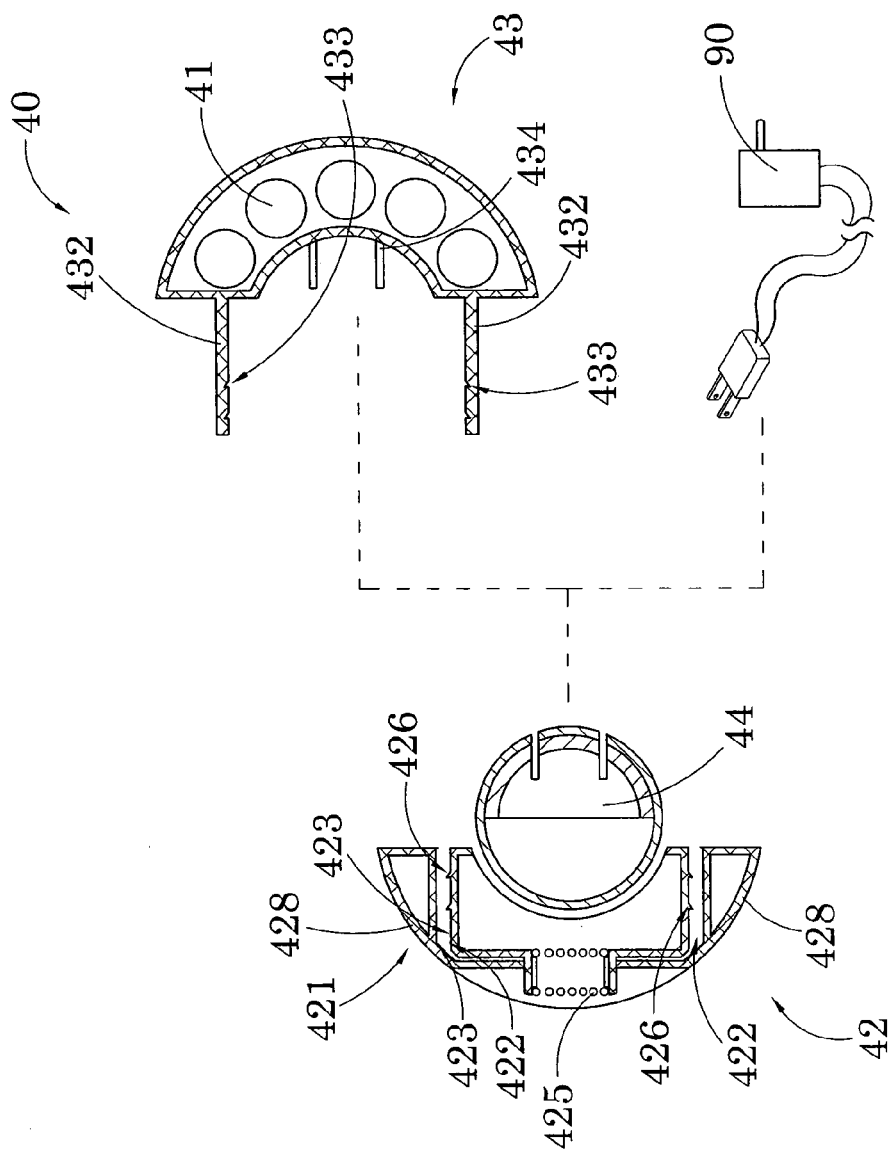

Referring to FIG. 8A and FIG. 8B of the drawings, according to the preferred embodiment of the present invention, the power supplying system 40 further comprises an electric socket 44 supported by the supporting post 21 to electrically connect with the illumination system 30, and a battery recharge housing 43 adapted to receive the rechargeable battery 41 to detachably couple with the electric socket 44 so as to electrically connect the rechargeable battery 41 with the illumination system 30. The electric socket 44 has at least a socket slot 441 supported within the supporting post 21, wherein the battery recharge housing 43 has at least a corresponding plugging head 434 slidably inserted into the socket slot 441 through the supporting post 21 to electrically connect the rechargeable battery 41 with the illumination system 30.

The power supplying system 40 further comprises a locking hub 42 for detachably locking the battery recharge housing 43 at the supporting post 21, wherein the locking hub 42 comprises a hub body 421 having two securing slots 422 and two engaging arms 432 spacedly extended from the battery recharge housing 43 to detachably insert into the securing slots 422 respectively so as to lock up the battery recharge housing 43 at the supporting post 21.

The hub body 421 comprises two actuation members 428 slidably mounted therein to form the two securing slots 422 between two inner walls 423 of the hub body 421 and two outer walls of the actuation members 428 respectively, and a resilient element 425 having two ends biasing against the two actuation members 428 respectively for applying an urging force against the actuation members 428 so as to substantially retain the two engaging arms 432 at the securing slots 422 respectively.

Each of the engaging arms 432 has a plurality of attachment teeth 433 spacedly formed thereon and each of the securing slots 422 has a plurality of engaging teeth 426 spacedly formed on an inner walls 423 thereof to engage with the attachment teeth 433 when the engaging arms 432 are slidably inserted into the securing slots 422 respectively so as to securely lock up the battery recharge housing 43 with the locking hub 42.

It is worth mentioning that the resilient element 425 normally exerts an urging force to the inner walls 423 of the securing slots 422 for biasing against the engaging arms 432 for ensuring a sound engagement between the battery recharge housing 43 and the locking hub 42. In order to detach the battery recharge housing 43 from the locking hub 42, the actuation member 428 should be slightly depressed so that the securing slots 422 are slightly pulled to distort for disengaging the attachment teeth 433 from the engaging teeth 426. Accordingly, the battery recharge housing 43 is capable of detaching from the locking hub 42.

In order to allow the user to selectively switch between the power supplying system 40 and the solar energy supplying system 50, the powering control circuit 60 further comprises a power switch 80 provided on the outdoor umbrella to electrically connect with the powering control circuit 60 for electrically switching the operation of the power supplying system 40 and the solar energy supplying system 50. Thus, the control switch 80 is provided on the outdoor umbrella to electrically connect with the powering control circuit 40 for manually switching an operation of the power supplying system 40 and the solar energy supplying system 50, preferably when the electrical energy stored in the solar energy collection unit 51 is below a predetermined level.

It is worth mentioning that the electric socket 44 may optimally comprise an AC electric adapter 90 extended from the umbrella frame 20 to electrically connect with the illumination system 30, the powering control circuitry 60 and an external AC power source, wherein the electric adapter 90 is selectively switched to provide power to the illumination system 30 directly by the external AC power source for lighting up the illumination system 30 without utilizing the solar energy supplying system 50 and the power supplying system 40. In other words, the user is given a further choice as to the power system for operating the illumination system 30. Depending on the circumstance in question, the user is free to selective which mode of operation (i.e. which power supplying system) of the outdoor umbrella.

Figure 12A:
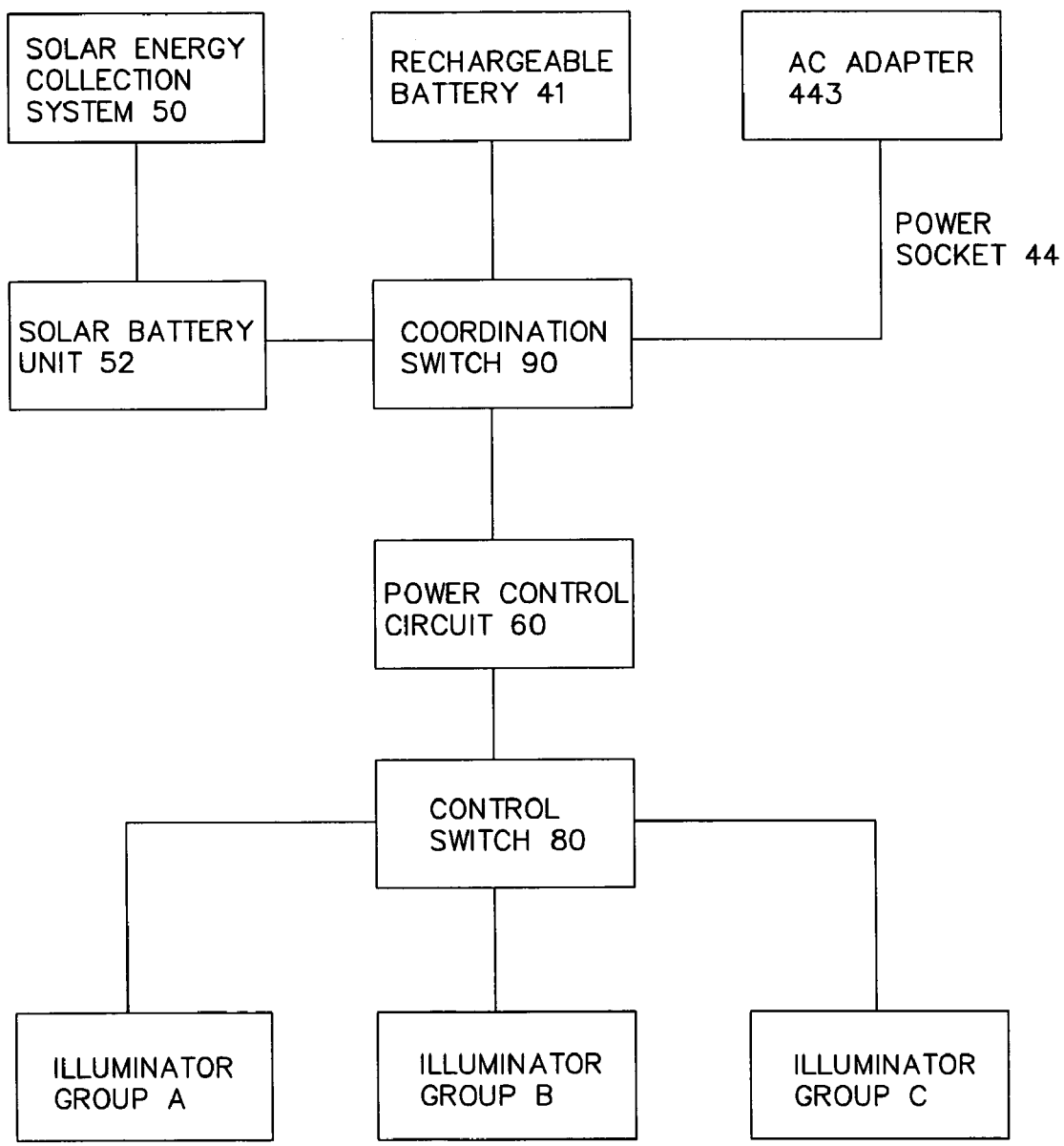
FIG. 12A, FIG. 12B and FIG. 12C are schematic diagrams of the electrical connection between various elements of the outdoors umbrella according to the above preferred embodiment of the present invention.
Figure 12B:
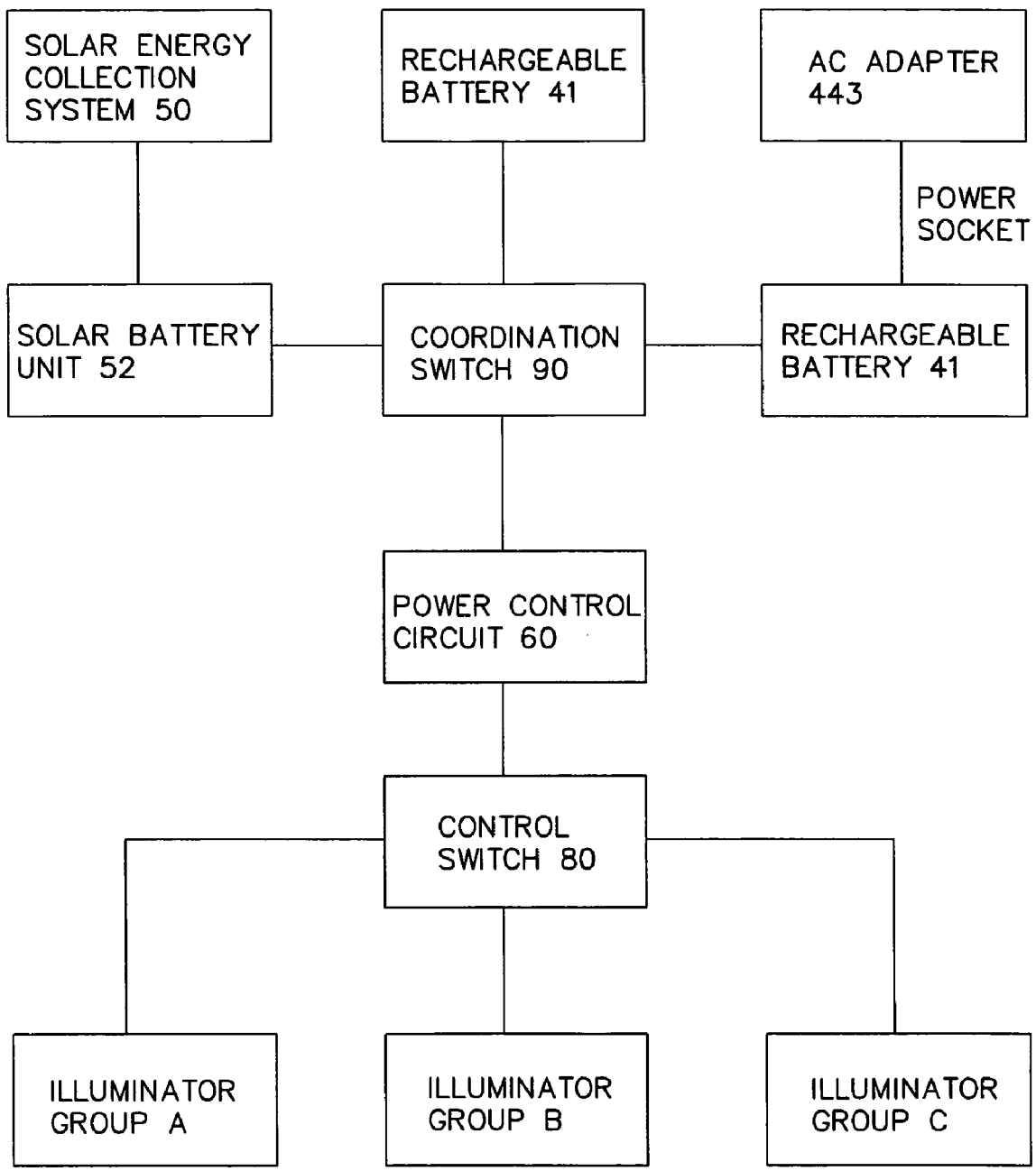
Figure 12C:
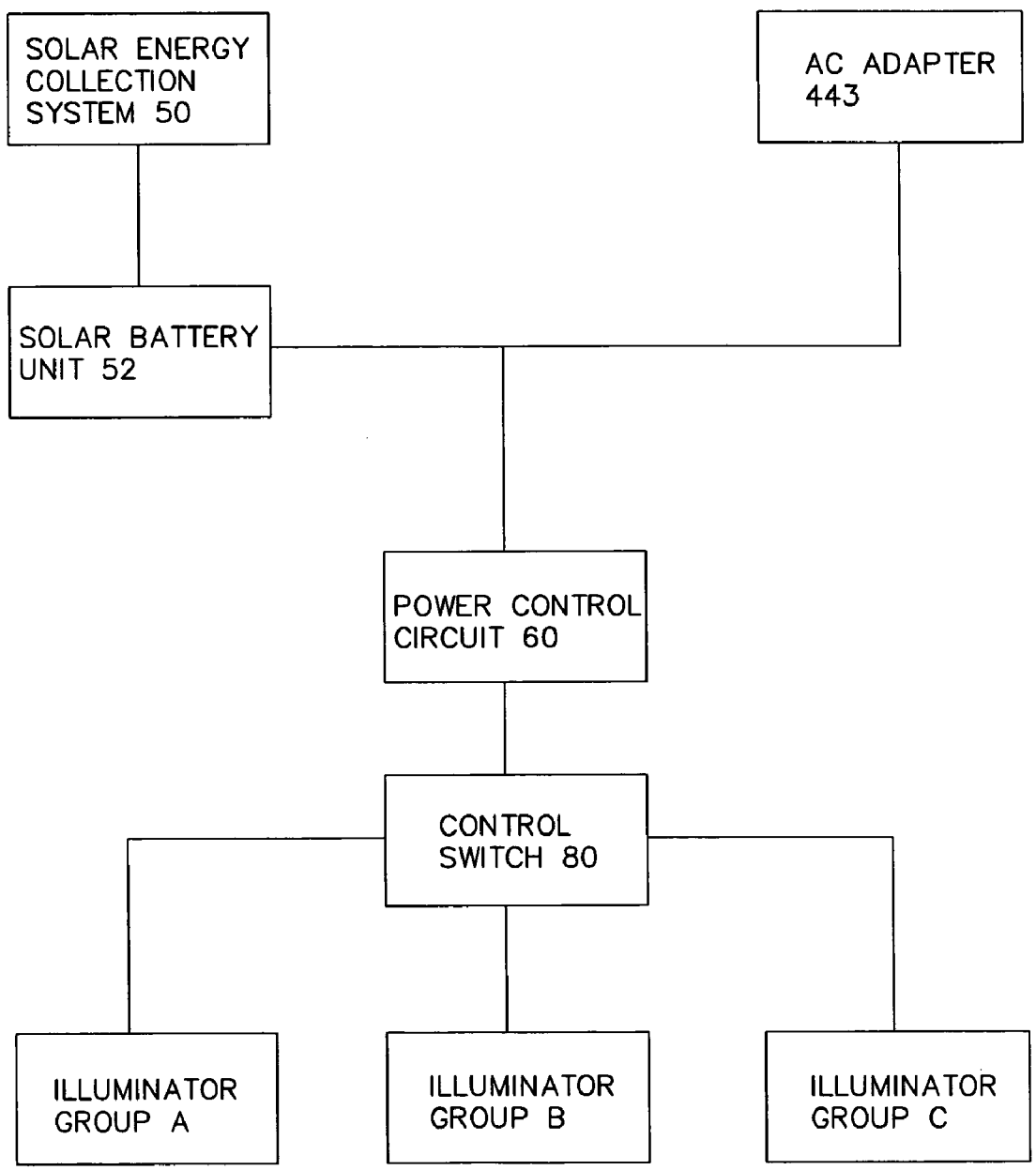

Finally, referring to FIG. 12A to FIG. 12C of the drawings, three different electrical configurations of the outdoor umbrella are illustrated. As shown in FIG. 12A of the drawings, the power control circuit 60 is adapted to switch power the supply to the illumination system 30 between the solar energy supplying system 50, external AC power source via the power socket 44, and the rechargeable battery 42. As shown in FIG. 12B of the drawings, the rechargeable battery 42 is directly rechargeable by the external AC source preferably via the power socket 44 so that the rechargeable battery is recharged whenever the power socket 44 is electrically connected with the external power source. As shown in FIG. 12C of the drawings, the outdoor umbrella may only comprise one rechargeable battery 41 (the solar battery unit 52 is subsumed into this rechargeable battery 41) which serve the solar energy supplying system 50 and is rechargeable by external AC power source. Moreover, the power control circuit 60 is adapted to control the illuminators 31 in groups so that illuminators 31 mounted along the awning arms 223 and awning ribs 224 are lit up by separate switching signal originated from the control switch 80. In other words, the user is able to control the illuminators 31 in such a manner that they are being lit in predetermined groups (e.g. Group A to Group C) for producing fascinating illumination effect. In order to coordinate these three power supplies to the illumination system 30, the outdoor umbrella may further comprise a coordination switch 90 electrically connecting between the power control circuitry 60 with the solar energy collection system 50, the rechargeable battery 41 and the power socket 44 so that the power control circuitry 60 may effective operate a particular power supply (such as the solar energy collection system 50) which is selected for operating the illumination system 30 via the coordination switch 90.

Figure 9A:
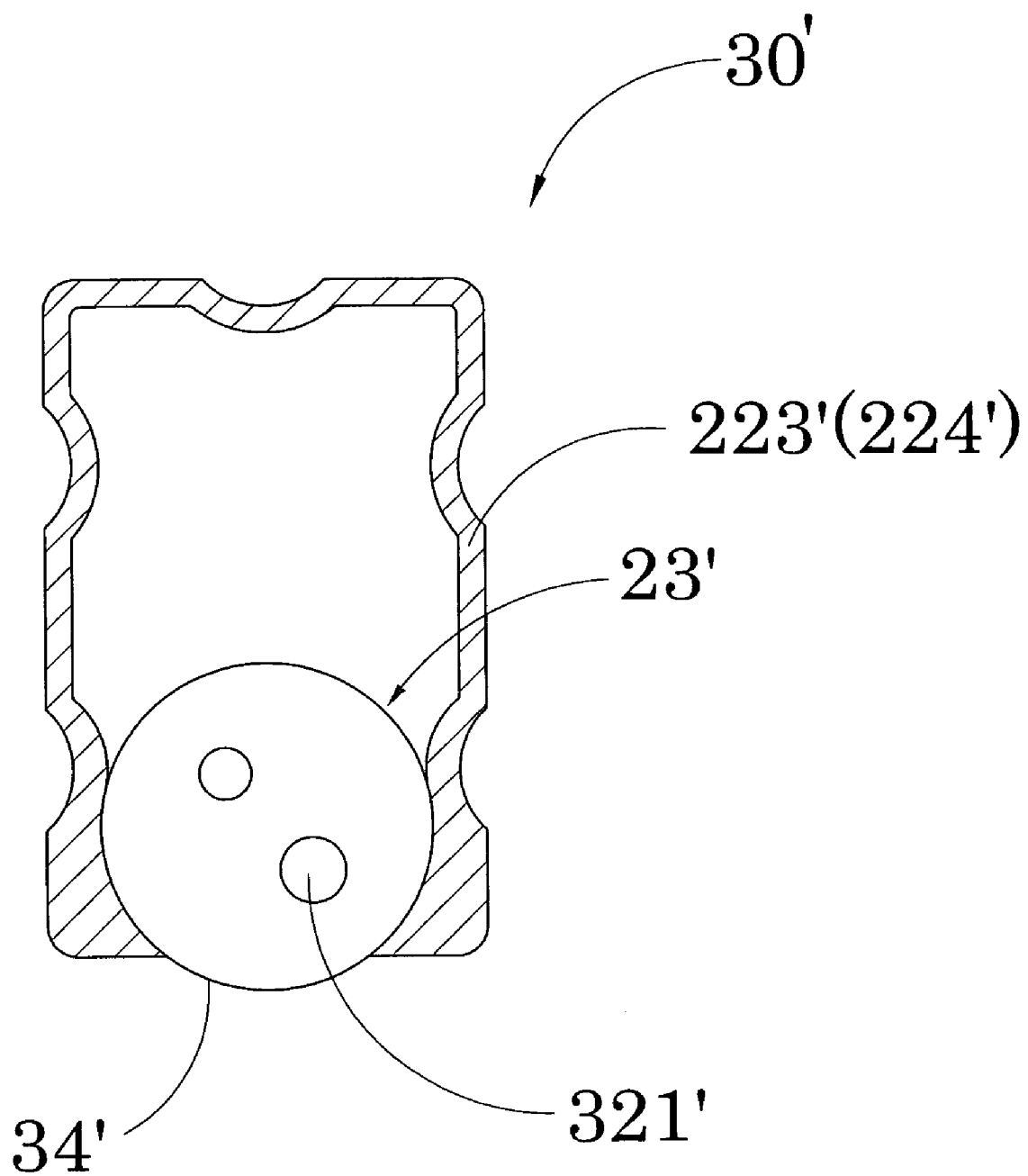
FIG. 9A and FIG. 9B are schematic diagrams of a first alternative mode of the outdoor umbrella according to the above preferred embodiment of the present invention.
Figure 9B:
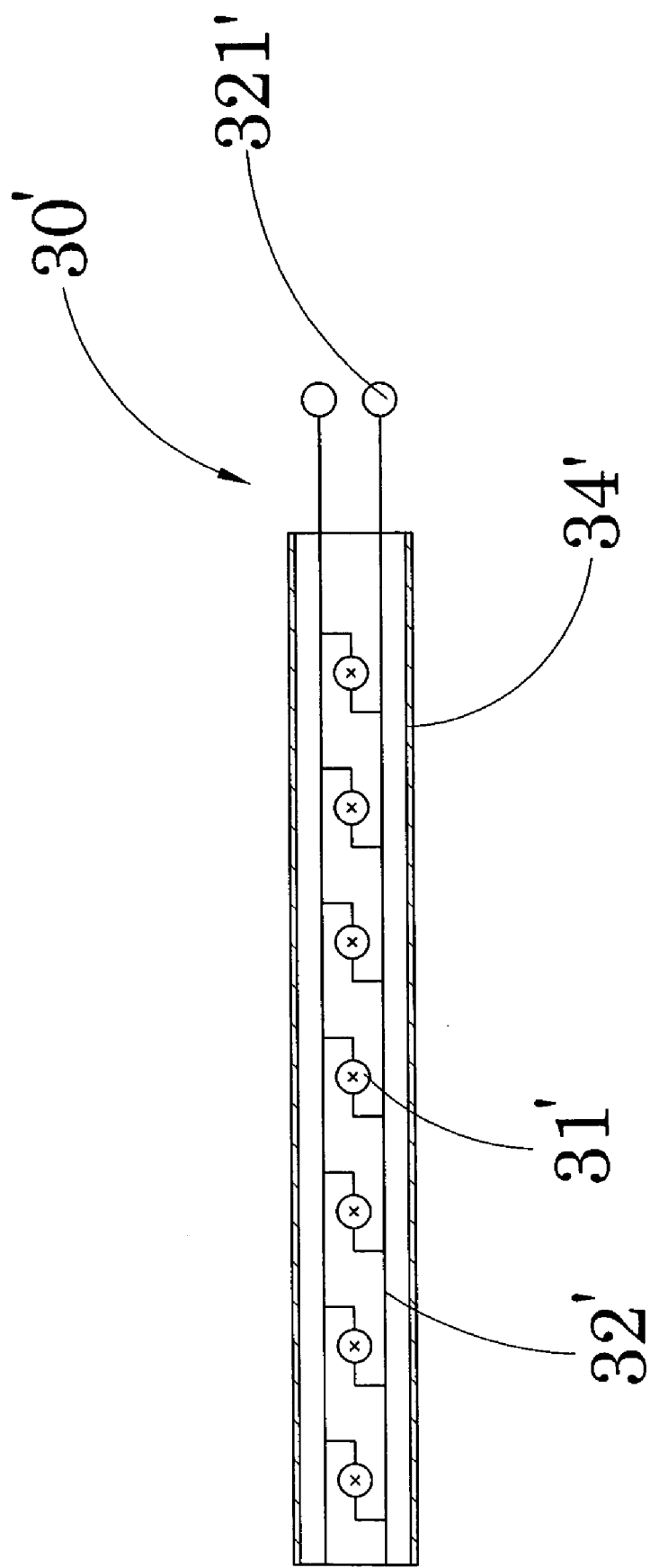

Referring to FIG. 9A and FIG. 9B of the drawings, a first alternative mode of the outdoor umbrella according to the above preferred embodiment is illustrated. The first alternative mode is similar to the preferred embodiment except the illumination system 30'. According to the first alternative mode, the illumination system 30' comprises a protective light tube 34' mounted on the awning arms 223' and the awning ribs 224' respectively, a plurality of connection wires 32', each having a positive and a negative end terminal 321', mounted within the respective protective light tube 34', wherein the illuminators 31' are spacedly mounted along the connection wires 32' on the within the respective protective light tube 34' for providing illumination along the awning arms 223' and the awning ribs 224' so as to light up the shading area underneath the awning 10'.

In order to achieve secure mounting of the protective light tubes 34', each of the awning arms 223' and the awning ribs 224' has a mounting slot 23' indently formed alone the awning arm 223' or the awning rib 224' wherein the protective light tubes 34' are securely mounted in the mounting slots 23' respectively so as to mount the illuminators 31' on the awning arms 223' or the awning ribs 224'.

Figure 10A:
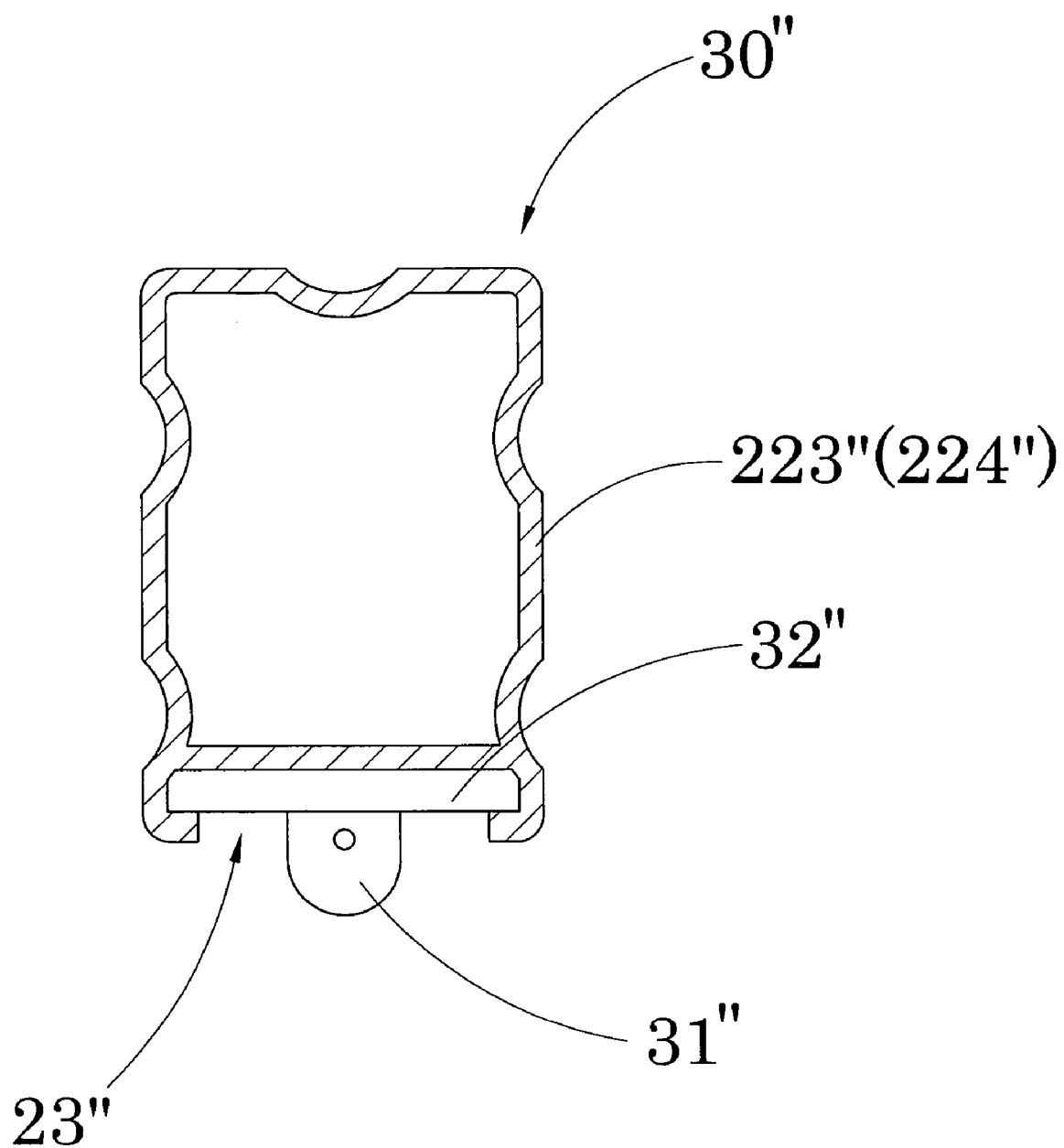
FIG. 10A and FIG. 10B are schematic diagrams of a second alternative mode of the outdoor umbrella according to the above preferred embodiment of the present invention.
Figure 10B:
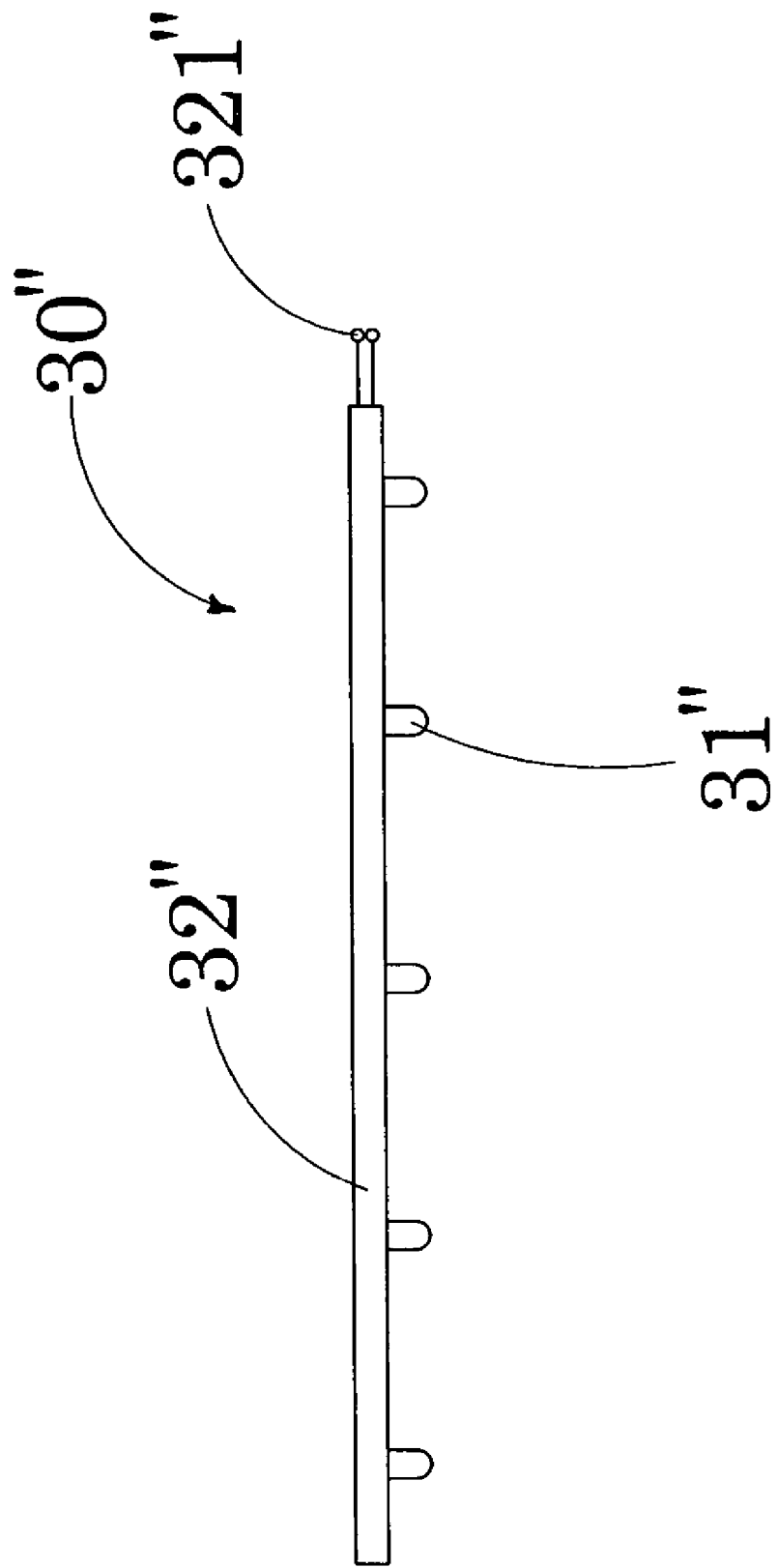

Referring FIG. 10A and FIG. 10B of the drawings, a second alternative mode of the outdoor umbrella according to the above preferred embodiment is illustrated. The second alternative mode is similar to the preferred embodiment except the illumination system 30". According to the second alternative mode, the illumination system 30" further comprises a plurality of connection wires 32", each having a positive and a negative end terminal 321", mounted along the awning arms 223" and the awning ribs 224" of the awning supporting frame 22 respectively, wherein the illuminators 31" are spacedly supported by and electrically connected with the connection wires 32" on the awning arms 223" and the awning ribs 224" for providing illumination along the awning arms 223" and the awning ribs 224" so as to light up the shading area underneath the awning 10".

In order to achieve secure mounting of the connection wires 32", each of the awning arms 223" and the awning ribs 224" has an elongated mounting slot 23" indently formed alone the awning arm 223" or the awning rib 224" wherein the connection wires 32" are securely mounted within the mounting slots 23" respectively so as to mount the illuminators 31" on the awning arms 223" or the awning ribs 224".

From the forgoing descriptions, it can be shown that the above-mentioned objects have been substantially accomplished. The present invention provides an outdoor umbrella which comprises the power supplying system 40 for selectively switching an optimal power supply of the illumination system 30 of the outdoor umbrella, so that the outdoor umbrella is capable of constantly providing illumination at any time.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An outdoor umbrella, comprising:

an awning;

an umbrella frame comprising an upward supporting post, and an awning supporting frame which is detachably coupled with a top portion of said supporting post and is radially extended to support said awning to define a shading area thereunder;

an illumination system provided at said umbrella frame for illuminating said shading area of said awning;

a power supplying system, which comprises a rechargeable battery which is supported by said umbrella frame and is electrically connected with said illumination system for supplying electrical power to said illumination system; and a solar energy supplying system, comprising:

a solar energy collection unit supported on top of said umbrella frame for collecting solar energy so as to transform said solar energy into an electrical energy;

a solar battery unit which is supported at said umbrella frame and is electrically connected between said solar energy collection unit and said illumination system, wherein said solar battery unit is adapted for storing said electrical energy from said solar energy collection unit in use for said illumination system; and a powering control circuit electrically connecting said solar battery unit with said rechargeable battery to coordinate a power supply to said illumination system, wherein said powering control circuit selectively switches said power supply of said illumination system between said power supplying system and said solar energy supplying system for ensuring said illumination system obtaining sufficient power to provide optimal level of illumination, and comprises a power switch electrically connecting between said power supplying system and said solar energy supplying system to automatically switch said power supply from said solar energy supplying system to said power supplying system when said electrical energy stored in said solar energy collection unit is below a predetermined level, wherein said solar collection unit comprises a solar energy housing, haying at least one solar energy collection panel transversely extended on top of said solar energy housing for exposing towards sunlight, mounted on top of said supporting post, and a solar conversion circuitry which is disposed in said solar energy housing and is electrically connected between said solar energy collection panel and said solar battery unit for converting solar energy collected by said solar energy collection panel into electrical power which is then transmitted to said solar battery unit for storage, wherein said power supplying system further comprises an electric socket supported by said supporting post to electrically connect with said illumination system and a battery recharge housing receiving said rechargeable battery to detachably couple with said electric socket so as to electrically connect said rechargeable battery with said illumination system, wherein said electric socket, having at least a socket slot, is supported within said supporting post, wherein said battery recharge housing has at least a corresponding plugging head slidably inserted into said socket slot through said supporting post to electrically connect said rechargeable battery with said illumination system;

wherein said power supplying system further comprises a locking hub for detachably locking said battery recharge housing at said supporting post, wherein said locking hub comprises a hub body having two securing slots and two engaging arms spacedly extended from said battery recharge housing to detachably insert into said securing slots respectively so as to lock up said battery recharge housing at said supporting post.

2. The outdoor umbrella, as recited in claim 1, wherein said hub body comprises two actuation members slidably mounted therein to form said two securing slots between two inner walls of said hub body and two outer walls of said actuation members respectively, and a resilient element having two ends biasing against said two actuation members respectively for applying an urging force against said actuation members so as to substantially retain said two engaging arms at said securing slots respectively.

3. The outdoor umbrella, as recited in claim 1, wherein each of said engaging arms has a plurality of attachment teeth spacedly formed thereon and each of said securing slots has a plurality of engaging teeth spacedly formed on an inner walls thereof to engage with said attachment teeth when said engaging arms are slidably inserted into said securing slots respectively so as to securely lock up said battery recharge housing with said locking hub.

4. The outdoor umbrella, as recited in claim 2, wherein each of said engaging arms has a plurality of attachment teeth spacedly formed thereon and each of said securing slots has a plurality of engaging teeth spacedly formed on an inner walls thereof to engage with said attachment teeth when said engaging arms are slidably inserted into said securing slots respectively so as to securely lock up said battery recharge housing with said locking hub.

5. The outdoor umbrella, as recited in claim 1, wherein said electric socket further comprises an AC electric adapter provided on said umbrella frame for electrically connecting with an external AC power source so as to directly supply electricity to said illumination system without utilizing said solar energy supplying system and said power supplying system.

6. The outdoor umbrella, as recited in claim 4, wherein said electric socket further comprises an AC electric adapter provided on said umbrella frame for electrically connecting with an external AC power source so as to directly supply electricity to said illumination system without utilizing said solar energy supplying system and said power supplying system.

7. The outdoor umbrella, as recited in claim 6, further comprising a control switch provided on said outdoor umbrella to electrically connect with said powering control circuit for manually switching an operation of said power supplying system and said solar energy supplying system.

* * * * *